United States Patent
Koshizen et al.

(10) Patent No.: US 7,054,724 B2
(45) Date of Patent: May 30, 2006

(54) BEHAVIOR CONTROL APPARATUS AND METHOD

(75) Inventors: Takamasa Koshizen, Saitama (JP); Hiroshi Tsujino, Saitama (JP); Hideaki Ono, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 216 days.

(21) Appl. No.: 10/484,147

(22) PCT Filed: Jul. 16, 2002

(86) PCT No.: PCT/JP02/07224

§ 371 (c)(1),
(2), (4) Date: Jan. 16, 2004

(87) PCT Pub. No.: WO03/009074

PCT Pub. Date: Jan. 30, 2003

(65) Prior Publication Data

US 2004/0162647 A1 Aug. 19, 2004

(30) Foreign Application Priority Data

Jul. 16, 2001 (JP) .............................. 2001-214907

(51) Int. Cl.
*G05D 1/00* (2006.01)

(52) U.S. Cl. ............................................. 701/1; 701/2

(58) Field of Classification Search ................ 701/1–4; 700/30, 85; 244/189, 195, 197
See application file for complete search history.

(56) References Cited

U.S. PATENT DOCUMENTS 4,092,716 A * 5/1978 Berg et al. ..................... 701/3
4,873,644 A 10/1989 Yasuo et al.

FOREIGN PATENT DOCUMENTS

| DE | 19645556 A | 10/1997 |
|----|-----------|---------|
| EP | 0390051 | 10/1990 |
| JP | 05-150607 | 1/1995 |
| JP | 06-266507 | 5/1996 |
| JP | 2000-185720 | 1/2001 |

OTHER PUBLICATIONS

International Search Report of International Application No. PCT/JP02/07224, Published as WO03/009074.
Nelson, R.C.; "Visual Homing Using An Associative Memory;" Biological Cypernetics; Aug. 1, 1991; pp. 281-291; vol. 65, No. 4; Springer Verlag, Heidelberg, DE.
Patent Abstracts of Japan; vol. 1997, No. 10; Oct. 31, 1997 & JP 09 170898 (Mitsubishi Electric Corp.), Jun. 30, 1997.

* cited by examiner

*Primary Examiner*—Yonel Beaulieu
(74) *Attorney, Agent, or Firm*—Fenwick & West, LLP (57) ABSTRACT

The invention relates to a behavior control apparatus and method for autonomously controlling a mobile unit based on visual information in practical application without the needs of a greatdeal of preparation or computational cost and limiting the type of target object. According to one aspect of the invention, a method for controlling behavior of a mobile unit using behavior command is provided. First, sensory inputs are captured and then the motion of the mobile unit is estimated. The portion which includes a target object to be target for behavior of the mobile unit is segregated from the sensory inputs. The target objects extracted from the segregated portion and the location of the target object is acquired. Finally, the mobile unit is controlled based on the location of target object.

24 Claims, 10 Drawing Sheets

BEHAVIOR CONTROL APPARATUS AND METHOD

TECHNICAL FIELD

The present invention relates to a behavior control apparatus and method for mobile unit, in particular, to a behavior control apparatus and method for recognizing a target object in acquired images and controlling behavior of the mobile unit with high accuracy based on the recognized target object.

BACKGROUND ART

To control a mobile unit with high accuracy based on input images, it is necessary for a control system to recognize an object in the image as a target for behavior of the mobile unit. One approach is that the control system learns training data pre-selected by an operator prior to recognition. Specifically, the control system searches the input images to extract some shapes or colors therefrom designated as features of the target. Then, the control system outputs commands to make the mobile unit move toward the extracted target.

However, it is necessary for the operator to teach features such as shape or color of the target in detail to the control system and therefore preparation for that is a burden in terms of time and labor. In addition, since the control would be interrupted when the target goes off the input image, it is difficult to apply this approach to practical use.

An alternative approach is that a template for the target is prepared and during controlling the mobile unit the template is always applied to input images to search and extract shape and location of the target in detail. In this case, however, computational cost would become huge because a computer has to keep calculating the shape and location of the target. Furthermore, the calculation of searching the target may fall into a local solution.

Therefore, to control behavior of the mobile unit efficiently and flexibly, it is preferable to make the mobile unit move autonomously rather than utilizing supervised learning method as a target is specified beforehand. To achieve that, a method for recognizing the target autonomously and learning the location of the target is needed. In Japanese Patent Application Unexamined Publication (Kokai) No. H8-126981, image position recognition method in robot system is disclosed. According to the method, the target object is searched out autonomically even when the target object is missing out of input image due to the error. However, the method requires that work plane for recognizing images is painted with various colors prior to working, which is substantially time-consuming task.

In Japanese Patent Application Unexamined Publication (Kokai) No. H7-13461, a method for leading autonomous moving robots for managing indoor air-conditioning units is disclosed. According to the method, a target object for leading is detected through image processing and the robot is leaded toward the target. However, the method needs blowing outlets of air-conditioning units as target objects, which lacks generality.

Therefore, it is objective of the present invention to provide a behavior control apparatus and method for autonomously controlling a mobile unit based on visual information in practical application without the needs of a great deal of preparation or computational cost and limiting the type of target object.

DISCLOSURE OF INVENTION

According to one aspect of the invention, a behavior control apparatus for controlling behavior of a mobile unit is provided. The apparatus comprises sensory input capturing method for capturing sensory inputs and motion estimating method for estimating motion of the mobile unit. The apparatus further comprises target segregation method for segregating the portion which includes a target object to be target for behavior of the mobile unit from sensory inputs, and target object matching method for extracting the target object from the segregated portion. The apparatus still further comprises target location acquiring method for acquiring the location of the target object and behavior decision method for deciding behavior command for controlling the mobile unit based on the location of the target object.

The behavior control apparatus roughly segregate the portion that includes a target object of behavior from sensory inputs, such as images, based on the estimation of motion. The apparatus then specifies a target object from the portion, acquires location of the target object and output behavior command which moves the mobile unit toward the location. Thus, detailed feature of the target object need not be predetermined. In addition, because the features irrelevant to present behavior are eliminated, the computational load is reduced. Therefore, highly efficient and accurate control for the mobile unit may be implemented.

As used herein, "mobile unit" refers to a unit which has a driving mechanism and moves in accordance with behavior commands.

The sensory inputs may be images of the external environment of the mobile unit.

The motion estimating method comprises behavior command output method for outputting the behavior command and behavior evaluation method for evaluating the result of the behavior of the mobile unit. The motion estimating method further comprises learning method for learning the motion of the mobile unit using the relationship between the sensory inputs and the behavior result and storing method for storing the learning result.

The behavior control apparatus pre-learns the relationship between sensory inputs and behavior commands. Then the apparatus updates the learning result when new feature is acquired on behavior control stage. The learning result is represented as probabilistic density distribution. Thus, motion of the mobile unit on behavior control stage may be estimated with high accuracy.

The motion of the mobile unit may be captured using a gyroscope instead of estimating it.

The target segregation method segregates the portion by comparing the sensory inputs and the estimated motion using such as optical flow. Thus the behavior control apparatus may roughly segregate the portion that includes a target object The target location acquiring method defines the center of the target object as the location of the target object and the behavior decision method outputs the behavior command to move the mobile unit toward the location of the target object. Thus the mobile unit may be controlled stably.

The behavior decision method calculates the distance between the mobile unit and the location of the target object, and deciding the behavior command to decrease the calculated distance. This calculation is very simple and helps to reduce the amount of computation.

If the calculated distance is greater than a predetermined value, the target segregation method repeats segregating the portion which includes a target object.

The target object matching method extracts the target object by pattern matching between the sensory inputs and predetermined templates. Thus the target object may be extracted more accurately.

Other embodiments and features will be apparent by reference to the following description in connection with the accompanying drawings.

BEST MODE FOR CARRYING OUT THE INVENTION

Preferred embodiments of the present invention will be described as follows with reference to the drawings.

A behavior control apparatus according to the invention recognizes a target object, which is a reference for controlling a mobile unit, from input images and then controls behavior of the mobile unit based on the recognized target object. The apparatus is used as installed on the mobile unit, which has driving mechanism and is movable by itself.

Configuration

Figure 1:
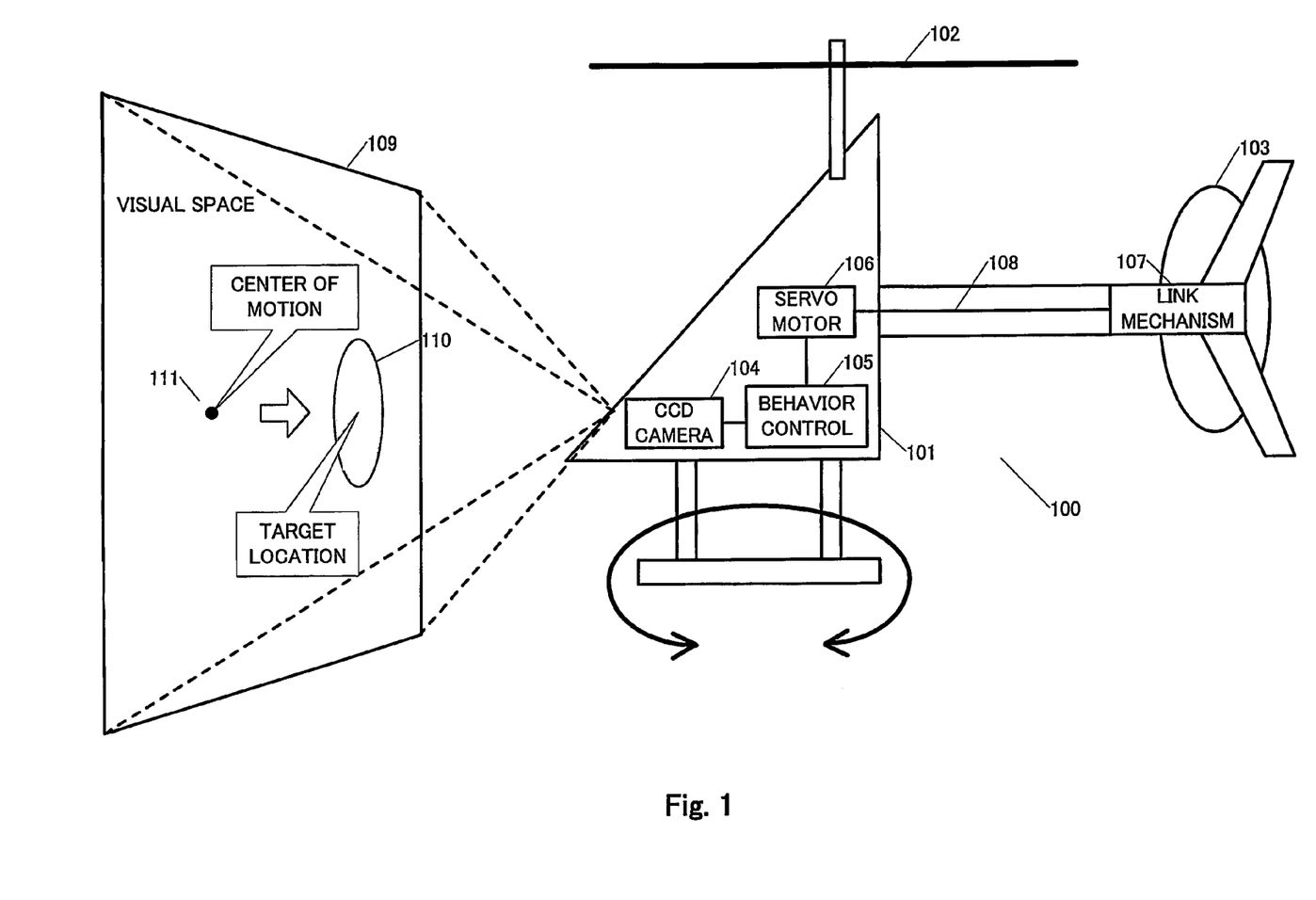
FIG. 1 shows overall view of a radio-controlled (RC) helicopter according to one embodiment of the invention.

FIG. 1 shows a radio-controlled (RC) helicopter 100 according to one embodiment of the invention. The RC helicopter 100 consists of body 101, main rotor 102 and tail rotor 103. On the body 101 are installed a CCD camera 104, a behavior control apparatus 105 and a servomotor 106. At the base of the tail rotor 103, there is link mechanism 107, which is coupled with the servomotor 106 through a rod 108. The RC helicopter 100 can float in the air by rotating the main rotor 102 and the tail rotor 103.

The CCD camera 104 takes images of frontal vision of the RC helicopter. Area taken by the camera is showed in FIG. 1 as visual space 109. The behavior control apparatus 105 autonomically recognizes a location of a target object 110 (hereinafter simply referred to as "target location 110"), which is to be a target for behavior control, and also recognizes self-referential point in the visual space 109 based on the image taken by the CCD camera 104. The target location 110 is represented as probabilistic density distribution, as described later, and is conceptually illustrated as ellipse in FIG. 1.

The RC helicopter 100 is tuned as that only the control of yaw orientation (as an arrow in FIG. 1, around the vertical line) is enabled. Therefore, term "stable" as used herein means that vibration of the RC helicopter's directed orientation is small.

The behavior control apparatus 105 outputs behavior commands to move the self-referential point (for example, center. This is hereinafter referred to as COM 111, acronym of "center of motion") of the image captured by CCD camera 104 (the visual space 109) toward the target location 110 in order to control the RC helicopter 100 stably. The behavior commands are sent to the servomotor 106. In response to the behavior commands, the servomotor 106 drives the rod 108, activating the link mechanism to alter the angle of tail rotor 103 so as to rotate the RC helicopter 100 in yaw orientation.

In the embodiment described above, controllable orientation is limited in one-dimensional operation such that COM moves from side to side for the purpose of simple explanation. However, the present invention may be also applied to position control in two or three dimensions.

Although the RC helicopter 100 is described as an example of the mobile unit having the behavior control apparatus of the present invention, the apparatus may be installed on any of mobile unit having driving mechanism and being able to move by itself. In addition, the mobile unit is not limited to flying objects like a helicopter, but includes, for example, vehicles traveling on the ground. The mobile unit further includes the unit only the part of which can moves. For example, the behavior control apparatus of the present invention may be installed on industrial robots of which base is fixed to floor, to recognize an operation target of the robot.

Figure 2:
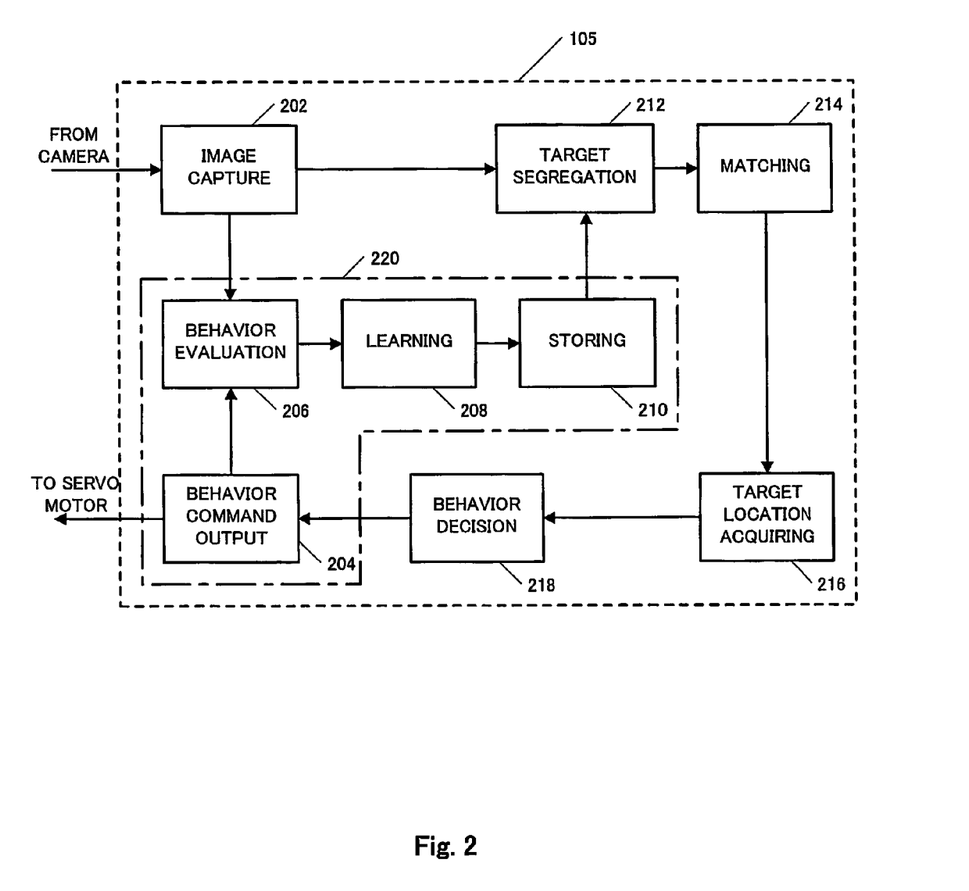
FIG. 2 is a functional block diagram illustrating one exemplary configuration of a behavior control apparatus according to the invention.

FIG. 2 is a functional block diagram of the behavior control apparatus 105. The behavior control apparatus 105 comprises an image capturing block 202, a behavior command output block 204, a behavior evaluation block 206, a learning block 208, a storage block 210, a target segregation block 212, a matching block 214, a target location acquiring block 216 and a behavior decision block 218. The behavior control apparatus 105 may be implemented by running a program according to the present invention on a general-purpose computer, and it can also be implemented by means of hardware having functionality of the invention.

The behavior control apparatus 105 first learns relationship between features of inputs (e.g., images taken by the CCD camera 104) and behavior of the mobile unit. These operations are inclusively referred to as "learning stage". Completing the learning stage, the apparatus may estimate motion of the mobile unit based on the captured images using learned knowledge. The apparatus further searches and extracts target location in the image autonomously using estimated motion. Finally, the apparatus controls the motion of the mobile unit with the reference to the target location. These operations are inclusively referred to as "behavior control stage".

It should be noted that the behavior control apparatus 105 shown in FIG. 2 is configured for use on the RC helicopter 100, and the apparatus may be configured in various manner depending on the characteristic of the mobile unit installed thereon. For example, the apparatus may further include a gyroscope sensor. In this case, the apparatus uses the signals generated from the gyroscope sensor to estimate motion of the mobile unit, and uses the sensory input captured by the image capturing block 202 only for recognizing the target location.

Learning

In learning stage, while moving the mobile unit, the behavior control apparatus 105 learns relationship between features of input images taken by an image pickup device and behavior result in response to behavior command from the behavior command output block 204. The apparatus then stores learning result in the storage block 210. This learning enables the apparatus to estimate motion of the mobile unit accurately based on input images in the behavior control stage described later.

The image capturing block 202 receives images every predetermined interval from an image pickup device such as CCD camera 104 installed in front of the RC helicopter 100. Then the block 202 extracts features as sensory inputs $I_i(t)$ (i=1,2, . . . ) from the images. This feature extraction may be implemented by any of prior-art approaches such as optical flow. The extracted features are sent to the behavioral evaluation block 206.

The behavior command output block 204 outputs behavior commands $Q_i(t)$, which directs behavior of the mobile unit. While the learning is immature in initial stage, behavior commands are read from command sequence which is selected randomly beforehand. During the mobile unit moves randomly, the behavior control apparatus 105 may learn necessary knowledge for estimating the motion of the mobile unit. As for the RC helicopter 100 shown in FIG. 1, the behavior commands correspond to driving current of the servomotor 106, which drives link mechanism 107 to change the yaw orientation. The behavior command is sent to driving mechanism such as the servomotor 106 and the behavior evaluation block 206. The relationship between the sensory inputs $I_i(t)$ and the behavior commands $Q_i(t)$ is represented by the following mapping $f$.

$$f: I_i(t) \mapsto Q_i(t) \quad (1)$$

where subscript i (i=1,2, . . . ) means i-th data. For example, the mapping $f$ may be given as a non-linear approximation translation using well-known Fourier series or the like.

In alternative embodiment, the behavior command output block 204 receives signal from an external device and outputs behavior commands in accordance with the signal.

The behavior evaluation block 206 generates reward depending on both sensory inputs $I_i(t)$ from image capturing block 202 and the behavior result in response to behavior command $Q_i(t)$ based on predetermined evaluation function under a reinforcement learning scheme. The example of the evaluation function is a function that yields reward "1" when the mobile unit controlled by behavior command is stable, otherwise yields reward "2". After the rewards are yielded, the behavior evaluation block 206 generates a plurality of columns 1,2,3, . . . , m as many as the number of type of the rewards and distributes behavior commands into each column responsive to the type of their rewards. Hereinafter the behavior commands $Q_i(t)$ distributed in column l are denoted as "$Q_i^l(t)$". Sensory inputs $I_i(t)$ and behavior command $Q_i(t)$ are supplied to learning block 208 and used for learning the relationship between them.

The purpose of the evaluation function is to minimize the variance of the behavior commands. In other words, the reinforcement learning satisfying $\sigma(Q^1) < \sigma(Q^2)$ is executed with the evaluation function. The minimum variance of the behavior commands needs to be reduced for smooth control. Learning with the evaluation function allows the behavior control apparatus 105 to eliminate unnecessary sensory inputs and to learn important sensory inputs selectively.

In each column, both sensory inputs and the behavior commands are stored according to the type of rewards given to the behavior commands.

Figure 3:
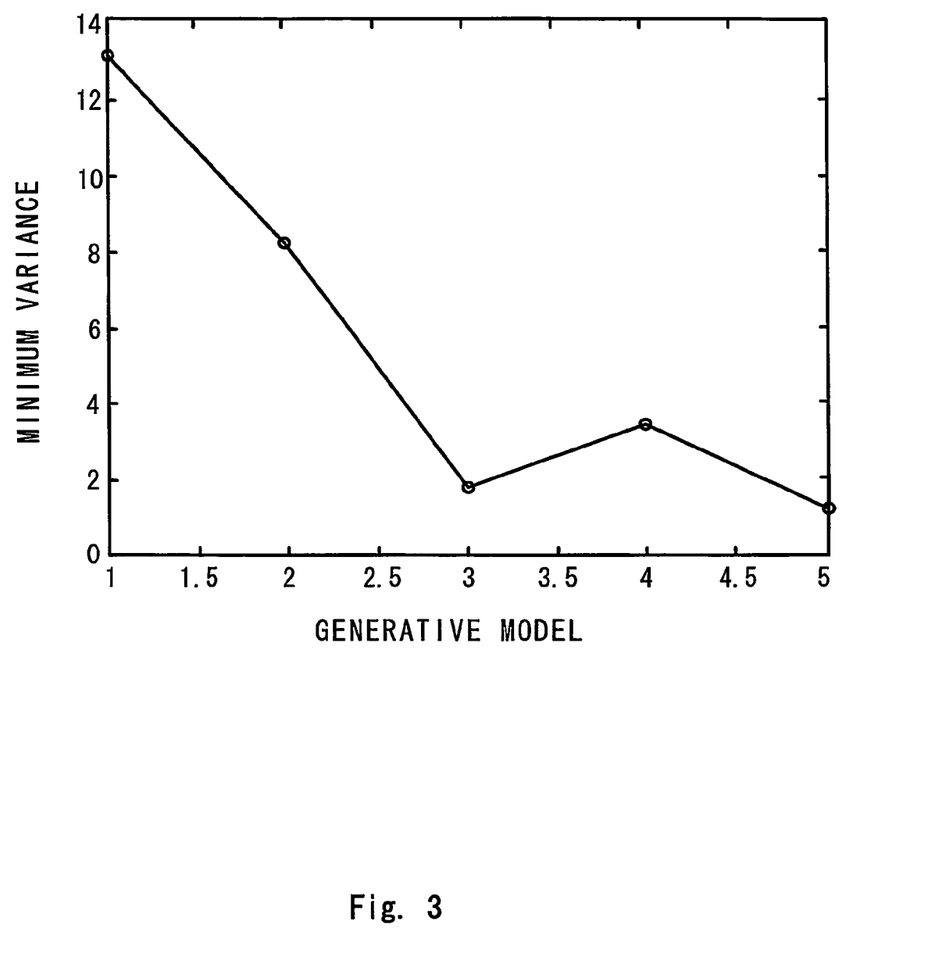
FIG. 3 is a graph illustrating the relationship between a generative model and minimum variance.

Each column 1,2,3, . . . ,m corresponds to a cluster model of the behavior commands. Each column is used to calculate generative models $g(\Omega_l)$ where l denotes the number of attention classes applied. Generative model is a storage model generated through learning, and may be represented by probabilistic density function in statistic learning. Non-linear estimation such as neural network may be used to model $g(\Omega_l)$, which gives the estimation of probabilistic density distribution $P(Q|\Omega_l)$. In the present embodiment, it is assumed that $P(Q|\Omega_l)$ takes the form of Gaussian mixture model, which may make approximation for any of probabilistic density function. FIG. 3 shows the relationship between the number of generative models (horizontal axis) and the minimum variance (vertical axis).

Only one column will not accelerate the convergence of the learning because, if so, it will take much time until the normal distribution curve of behavior commands stored in the column is sharpened and the variance gets small. In order to control the mobile unit stably, it needs to learn in such a way that the variance of normal distribution of motor output becomes smaller. One feature of the invention is that the normal distribution curve is sharpened rapidly since a plurality of columns are generated. A method utilizing such minimum variance theory is described in Japanese Patent Application Unexamined Publication (Kokai) No. 2001-028758.

Then the learning process described later is executed in the learning block 208. After the learning process is completed, a behavior command for minimizing the variance of the normal distribution curve of behavior commands for a new sensory input may be selected out of the column by means of a statistical learning scheme, and the rapid stability of the mobile unit may be attained.

Now the learning process at the learning block 208 will be described in detail.

The learning block 208 calculates the class of attention $\Omega_l$ corresponding one by one to each column l which contains the behavior commands using identity mapping translation. This translation is represented by the following mapping h.

$$h: Q_i(t) \mapsto \Omega_l(t) \quad (2)$$

The purpose of the class of attention $\Omega_l$ is efficient learning by focusing on the particular sensory inputs from massive sensory inputs when new sensory inputs are given. Generally, the amount of sensory inputs far exceeds the processing capacity of the computer. Thus, appropriate filtering for sensory inputs with the classes of attention $\Omega_l$ improves the efficiency of the learning. Therefore, the learning block 208 may eliminate the sensory inputs except the selected small subset of them.

When the learning goes forward, the learning block 208 may know directly the class of attention corresponding to the sensory input using the statistical probability without calculating the mapping f and/or h one by one. More specifically, each of the classes of attention $\Omega_l$ is a parameter for modeling the behavior commands $Q_i^l(t)$ stored in each column using the probabilistic density function of the normal distribution. To obtain the probabilistic density function, a mean $\mu$ and covariance $\Sigma$ need to be calculated for the behavior commands $Q_i^l(t)$ stored in each column. This calculation is performed by unsupervised Expectation Maximization (EM) algorithm using clustered component algorithm (CCA), which will be described later. It should be noted that the classes of attention $\Omega_l$ are modeled on the assumption that true probabilistic distribution $p(I_i(t)|\Omega_l)$ will exists for each class of attention $\Omega_l$.

Using the obtained parameters, probabilistic density function of each class of attention $\Omega_1$ may be obtained. The obtained density functions are used as prior probability $\bar{p}(\Omega_l(t))(=\bar{p}(Q_l(t)|\Omega_l(t)))$ of each class of attention before sensory inputs are given. In other words, each class of attention $\Omega_l$ is assigned as an element of the probabilistic density function $p(Q_l^J(t)|\Omega_l, \theta)$.

After the classes of attention $\Omega_l$ are calculated, the learning block 208 learns the relation between the sensory inputs and the classes of attention by means of supervised learning scheme using neural network. More specifically, this learning is executed by obtaining conditional probabilistic density function $p_\lambda(I_i(t)|\Omega_l)$ of the class of attention $\Omega_1$ and the sensory input $I_i(t)$ using hierarchical neural network with the class of attention $\Omega_l$ as supervising signal. It should be noted that the class of attention may be calculated by synthetic function f·h . The obtained conditional probabilistic density function $p(I_i(t)|\Omega_l)$ corresponds to the probabilistic relation between the sensory input and the class of attention.

New sensory inputs gained by CCD camera 104 are provided to the behavior control apparatus 105 after the learning is over. The learning block 208 selects the class of attention corresponding to provide sensory input using statistical learning scheme such as bayes' learning. This operation corresponds to calculating conditional probabilistic density function $p(\Omega_l|I_i(t))$ of the class of attention $\Omega_l$ relative to the sensory inputs $I_i(t)$. As noted above, since the probabilistic density function of the sensory inputs and the class of attention has been already estimated by the hierarchical neural network, newly given sensory inputs may be directly assigned to particular class of attention. In other words, after the supervised learning with neural network is over, calculation of the mapping $f$ and/or $h$ become unnecessary for selecting class of attention $\Omega_l$ relative to sensory input $I_i(t)$.

In this embodiment, bayes' learning scheme is used as the statistical learning scheme. Assume that sensory inputs $I_i(t)$ are given and both prior probability $\bar{p}(\Omega_l(t))$ and probabilistic density function $p(I_i(t)|\Omega_l)$ have been calculated beforehand. Maximum posterior probability for each class of attention is calculated by following bayes' rule.

$$p(\Omega_l(t)) = \frac{\bar{p}(\Omega_l(t))p(I_i(t)|\Omega_l(t))}{\sum \bar{p}(\Omega_k(t))p(I_i(t)|\Omega_k(t))} \quad (3)$$

The $p(\Omega_l(t))$ may be called the "belief" of $\Omega_l$ and is the probability that a sensory input $I_i(t)$ belongs to a class of attention $\Omega_1(t)$. Calculating the probability that a sensory input $I_i(t)$ belongs to a class of attention $\Omega_l$ using bayes' rule implies that one class of attention $\Omega_l$ can be identified selectively by increasing the belief (weight) by learning of bayes' rule.

The class with highest probability (belief) is selected as class of attention $\Omega_l$ corresponding to the provided sensory input $I_i(t)$. Thus, the behavior control apparatus 105 may obtain the class of attention $\Omega_l$ that is hidden parameter from directly observable sensory input $I_i(t)$ using bayes' rule and to assign the sensory input $I_i(t)$ to corresponding class of attention $\Omega_l$.

The learning block 208 further searches behavior command according to the sensory input stored in the column corresponding to the selected class of attention, then send the searched behavior command to the target segregation block 212.

As noted above, using the blocks 204–210, the behavior control apparatus may estimate motion of the mobile unit accurately based on input images. Therefore, these blocks are inclusively referred to as "motion estimating method" in appended claims.

Behavior Control

On behavior control stage, the behavior control apparatus 105 estimates the motion based on input image and roughly segregates the location of the target object (target location). Then the apparatus performs pattern matching with templates which are stored in the memory as target object and calculate the target location more accurately. And the apparatus indicates to output the behavior command based on the distance between the target location and center of motion (COM). By repeating this process, the target location is getting refined and the mobile unit reaches in stably controlled status. In other words, the apparatus segregates the target based on motion estimation and understands what is to be target object.

Now the functionality of each block is described.

Target segregation block 212 roughly segregates and extracts a potion including target object, which are to be the behavior reference of the mobile unit, from visual space. For example, the segregation is done by comparing optical flow of the image and the estimated motion.

Target object matching block 214 uses templates to extract the target object more accurately. The target object matching block 214 compares the template and the segregated portion and determines whether the portion is the object to be targeted or not. The templates are prepared beforehand. If there are plurality of target objects, or if there are plurality of objects which match with the templates, the object having largest matching index is selected.

A target location acquiring block 216 defines the center point of the target object as the target location.

When the target location is defined, behavior decision block 218 supplies request signal to behavior command output block 204. When the request signal is received, behavior command output block 204 outputs the behavior command to move such that center of motion (COM) of the mobile unit overlaps the location of the target object.

Figure 4:
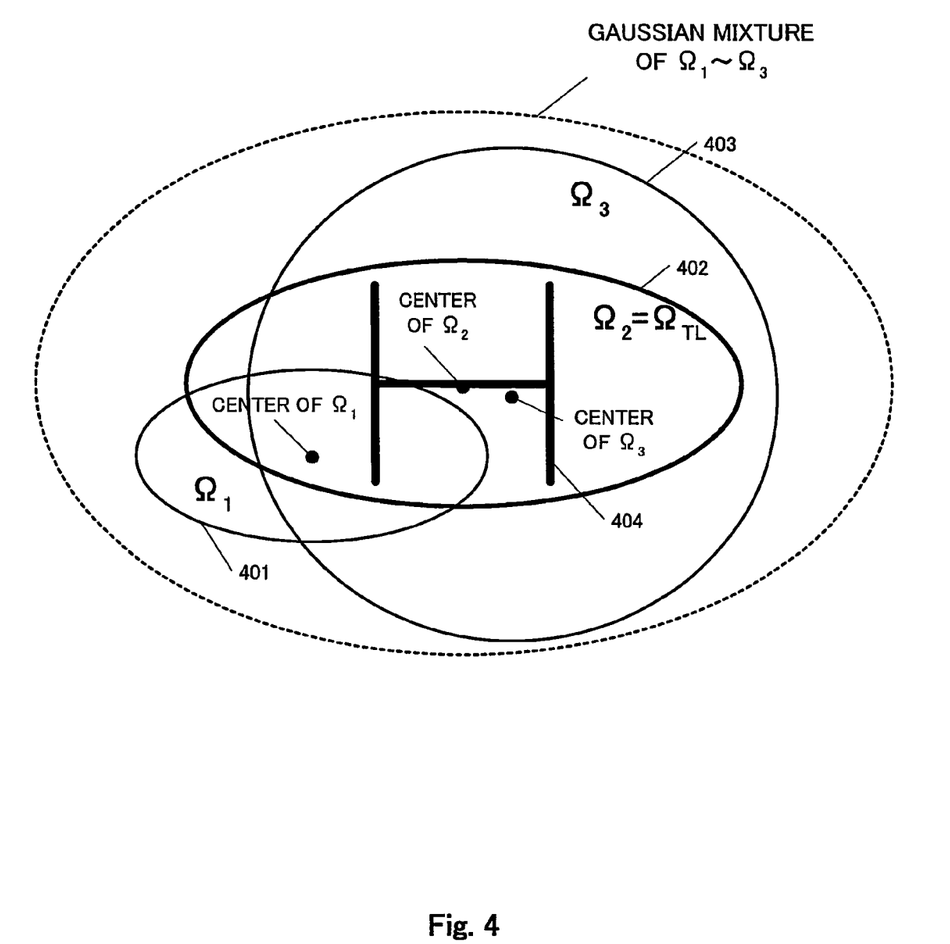
FIG. 4 shows a conceptual illustration of a target object recognized by means of target segregation.

It is indispensable for determining behavior command autonomously to segregate the target and non-target. The reason is because a target object segregated by target segregation may be used to select the optimal behavior to control the target object toward the location. In other words, the actual most suitable behavior is selected by predicting center of motion (COM) based on selective attention. Thus it allows the behavior control apparatus to search the location of the target object accurately in captured image. FIG. 4 is a diagram illustrating a target object segregation recognized by the target segregation block 212. Ellipses 401, 402, 403 are the cluster to be the location of the target object calculated based on the estimated motion and represented as normal distribution $\Omega_1$, $\Omega_2$, $\Omega_3$, respectively. These are attention classes extracted from feature information of the image. Mixture distribution of three normal distribution model $\Omega_1$, $\Omega_2$, $\Omega_3$ are showed as a dotted-lined ellipse in FIG. 4. Center of motion is acquired as center of mixture distribution in visual space. Each gaussian distribution in visual space is produced by projecting clustered behavior space based on center of motion on visual space with non-linear mapping like neural network.

Assuming that $\Omega_{TL}$ represents the target location and $\sigma$ represents the area where segregating may be executed in captured image, the location of the target object is modeled by probability density function $P(\Omega_{TL}|\sigma)$. Since the location $\Omega_{TL}$ is basically uncertain value, it is assumed that the location has behavior control noise (that is, the variance of probabilistic density distribution). By repeating feedback process, noise (variance) of the target location is reduced and refined. In the present invention, reduction of noise (variance) depends on the accuracy of the motion estimation of the mobile unit.

Figure 5:
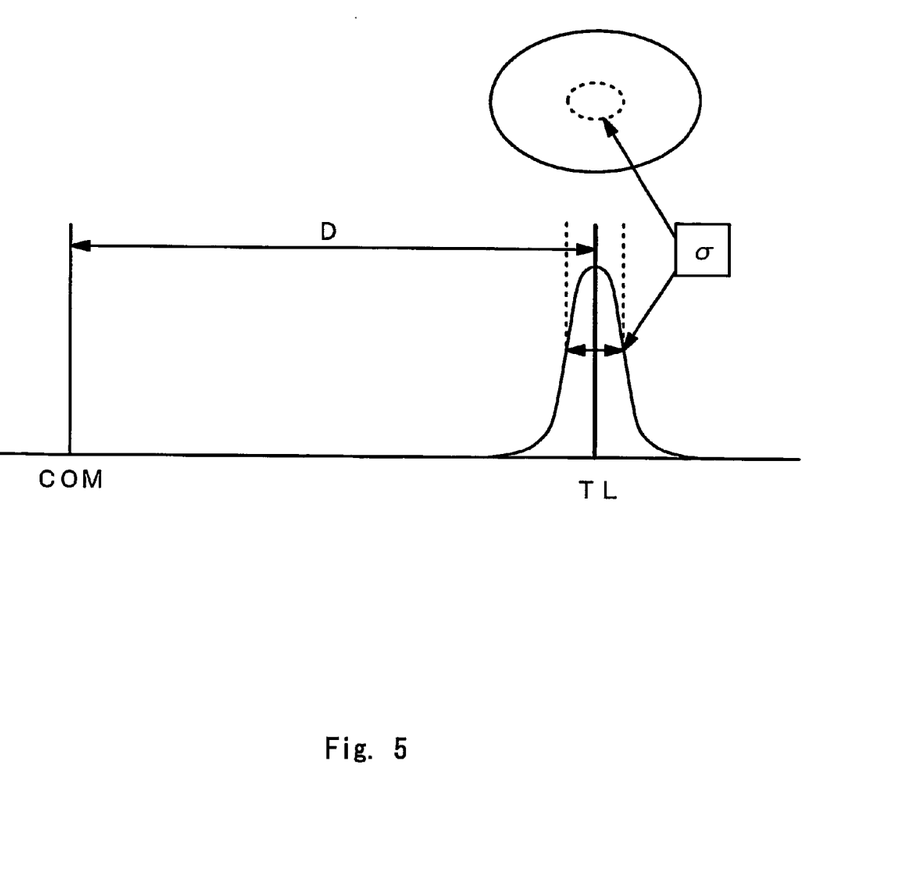
FIG. 5 is a chart illustrating that the range of the target object is narrowed by learning.

FIG. 5 is a chart illustrating that range of the target location is refined (reduced) by the learning. Learning block 208 narrows down uncertain probability range (in other words, variance of probabilistic density distribution) $\sigma$ of the location of the target location by, for example, bayes' learning.

CCA Reinforced EM Algorithm

Now CCA reinforced EM algorithm is described in detail.

The EM algorithm is an iterative algorithm for estimating the maximum likelihood parameter when observed data can be viewed as incomplete data. When the observed data is the normal distribution, the parameter $\theta$ is represented by $\theta(\mu, \Sigma)$.

In one embodiment of the invention, the model of feature vector is built by means of bayes' parameter estimation. This is employed to estimate the number of clusters which represents data structure best.

Algorithm to estimate a parameter of Gaussian mixture model will be described. This algorithm is similar to conventional clustering essentially, but is different in that it can estimate parameters closely when clusters are overlapped. Therefore, sample of training data is used to determine the number of subclass and the parameters of each subclass.

Let Y be an M dimensional random vector to be modeled using a Gaussian mixture distribution. Assume that this model has K subclasses. The following parameters are required to completely specify the k-th subclass.

$\pi_k$: the probability that a pixel has subclass k $\mu_k$: the M dimensional spectral mean vector for subclass k $R_k$: the M times M spectral covariance matrix for subclass k $\pi$, $\mu$, R denote the following parameter sets, respectively.

$$\{\pi_k\}_{k=1}^{K}, \{\mu_k\}_{k=1}^{K}, \{R_k\}_{k=1}^{K} \qquad (4)$$

The complete set of parameters for the class are then given by K and $\theta=(\pi, \mu, R)$. Note that the parameters are constrained in a variety of ways. In particular, K must be an integer greater than 0, $\pi_k \geq 0$ with $\Sigma\pi_k=1$, and $\det(R) \geq \epsilon$, where might be chosen depending on the application. The set of admissible $\theta$ for a k-th order model is denoted by $\rho$.

Let $Y_1, Y_2, \ldots, Y_n$ be N multispectral pixels sampled from the class of interest. Moreover, assume that the subclass of that pixel is given by the random variable $X_n$ for each pixel $Y_i$. Certainly, $\Omega_n$ is normally not known, and which can also be useful for analyzing the problem.

Letting each subclass be a multivariate Gaussian distribution, the probability density function for the pixel $Y_n$ for $\Omega_n=k$ is given by $$p_{y_n|x_n}(y_n|k, \theta) = \frac{1}{(2\pi)^{M/2}}|R_k|^{-1/2} \qquad (5)$$
$$\exp\{-0.5(y_n-\mu_k)^t R_k^{-1}(y_n-\mu_k)\}$$

Since the subclass $\Omega_n$ of each sample is not known, to compute the density function of $Y_{nm}$ for given parameter $\theta$, the following definition of conditional probability is applied.

$$p_{y_n}(y_n|\theta) = \sum_{k=1}^{K} p_{y_n|x_n}(y_n|k, \theta)\pi_k \qquad (6)$$

The logarithm of the probability of the entire sequence $$Y = \{Y_n\}_{n=1}^{N} \qquad (7)$$

is as follows.

$$\log p_y(y|K, \theta) = \sum_{n=1}^{N} \log\left(\sum_{k=1}^{K} p_{y_n|x_n}(y_n|k, \theta)\pi_k\right) \qquad (8)$$

The objective is then to estimate the parameters K and $\theta \in \rho^{(K)}$.

Minimum description length (MDL) estimator works by attempting to find the model order which minimizes the number of bits that would be required to code both the data samples $y_n$ and the parameter vector $\theta$. MDL reference is expressed like the following expression.

$$MDL(K,\theta) = -\log p_y(y|K,\theta) + 2L \log(NM) \qquad (9)$$

Therefore, the objective is to minimize the MDL criteria $$MDL(K, \theta) = -\sum_{n=1}^{N} \log\left(\sum_{i=1}^{K} p_{y_n|x_n}(y_n|k, \theta)\pi_k\right) + \frac{1}{2}L\log(NM) \qquad (10)$$

In order to derive the EM algorithm update equations, it is required to compute the following equation (Expectation step)

$$Q(\theta; \theta^{(i)}) = E[\log p_{y,x}(y, X|\theta)|Y=y, \theta^{(i)}] - \frac{1}{2}L\log(NM) \qquad (11)$$

where Y and X are the sets of random variables $$\{Y_n\}_{n=1}^{N}, \{X_n\}_{n=1}^{N} \qquad (12)$$

respectively, and y and x are realizations of these random objects.

Thus the following equation holds.

$$MDL(K,\theta) - MDL(K,\theta^{(i)}) \leq Q(\theta^{(i)};\theta^{(i)}) - Q(\theta;\theta^{(i)}) \quad (13)$$

This results in a useful optimization method since any value of $\theta$ that increases the value of $Q(\theta;\theta^{(i)})$ is guaranteed to reduce the MDL criteria. The objective of the EM algorithm is hereby to iteratively optimize with respect to $\theta$ until a local minimum of the MDL function is reached.

The Q function is optimized in the following way.

$$Q(E,\pi;E^{(i)},\pi^{(i)}) = E[\log p_{y,x}(Y,X|E,\pi)|y,E^{(i)},\pi^{(i)}] - KM \log(NM) \quad (14)$$

In this case, $$Q \approx \sum_{k=1}^{K}\left\{-\frac{1}{2}tr(P_k \bar{R}_k) - \frac{(M-1)\bar{N}_k}{2}\log(2\pi) + \bar{N}_k \log \pi_k\right\} - KM\log(NM) \quad (15)$$

where $$\bar{N}_k = \sum_{n=1}^{N} p_{x_n|y_n}(k \mid y_n, E^{(i)}, \pi^{(i)}) \quad (16)$$

$$\bar{R}_k = \sum_{n=1}^{N} y_n y_n^t p_{x_n|y_n}(k \mid y_n, E^{(i)}, \pi^{(i)})$$

The EM update equations then are following.

$$(E^{(i+1)},\pi^{(i+1)}) = \arg\min_{E,\pi} Q(E,\pi;E^{(i)},\pi^{(i)}) \quad (17)$$

The solution is given as follows.

$$e_k^{(i+1)} = \text{principal eigenvector } \bar{R}_k \pi_k^{(i+1)} = \bar{N}_k/N \quad (18)$$

Initially, the number K of subclasses will be started with sufficiently large, and then be decremented sequentially. For each value of K, the EM algorithm is applied until it is converged to a local maximum of the MDL function. Eventually, the value of K may be selected simply and corresponding parameters that resulted in the largest value for the MDL criteria may be selected.

One method to effectively reduce K is to constrain the parameters of two classes to be equal, such that $e_l = e_m$ for classes l and m. Moreover, letting $E^*$ and $E^*_{l,m}$ be the unconstrained and constrained solutions to Eq (17), a distance function may be defined as follows.

$$d(l,m) = Q(E^*,\pi^*;E^{(i)},\pi^{(i)}) - Q(E^*_{l,m}\pi^*;E^{(i)},\pi^{(i)}) = \sigma_{max}(R_l) \sigma_{max}(R_m) - \sigma_{max}(R_l + R_m) \geq 0 \quad (19)$$

where $\sigma_{max}(R)$ denotes the principal eigenvalue of R. At each step, the two components that minimized the class distance are computed.

$$(l^*,m^*) = \arg\min_{l,m} d(l,m) \quad (20)$$

After all, the two classes are merged and the number of subclass K is decreased.

Process of Behavior Control Apparatus

It should be noted that the learning stage and behavior control stage are not also divided clearly, but both of them may be executed simultaneously as one example described bellow.

In other words, behavior evaluation block 206 determines whether feature of image provided afresh should be reflected to knowledge acquired by previous learning in behavior control stage. Furthermore, behavior evaluation block 206 receives the motion estimated from the image. When change of the external environment that was not learned in previous learning is captured by image capturing block 202, the feature is sent to behavior evaluation block 206, which outputs attentional demanding for indicating generation of an attention class. In response to this, learning block 208 generates an attention class. Thus learning result is always updated; therefore, precision of the motion estimation is improved, too.

Figure 6:
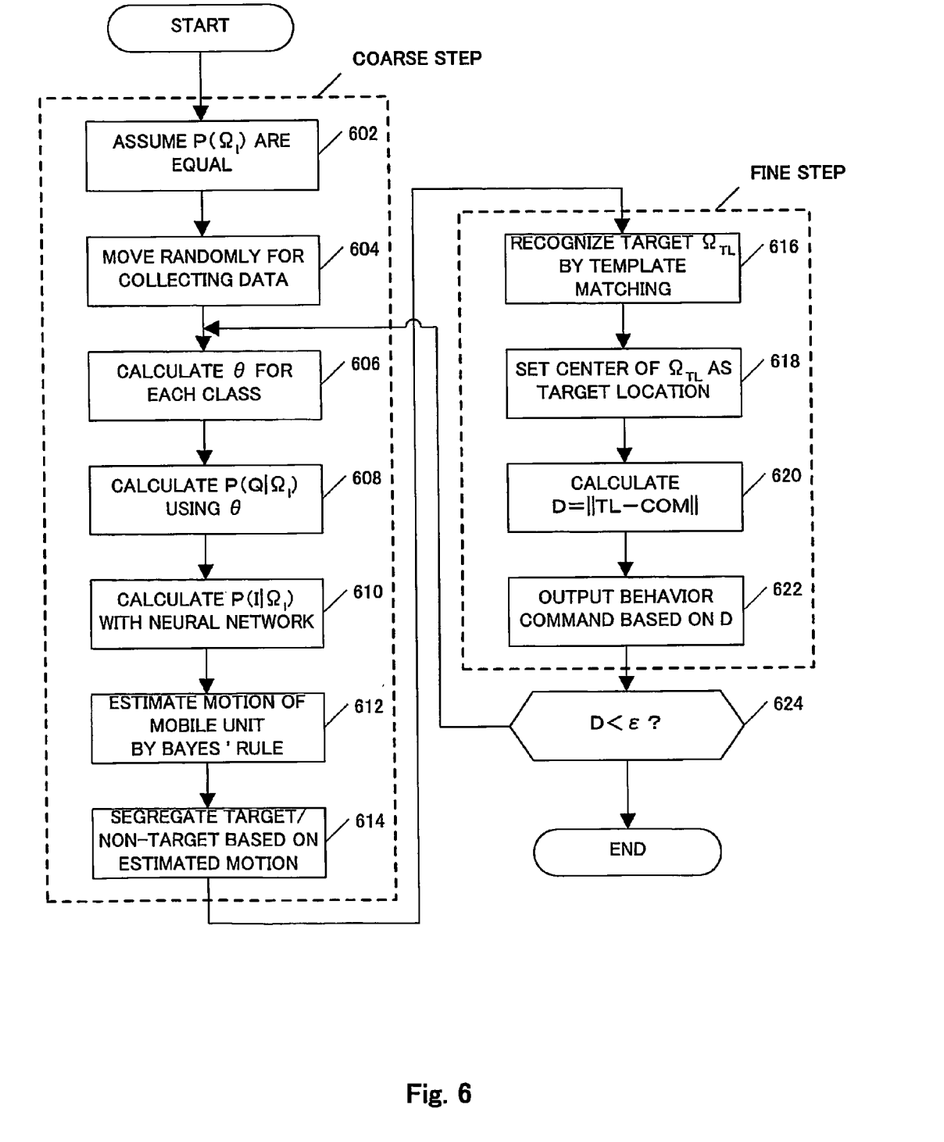
FIG. 6 is a flowchart illustrating control routine of a RC helicopter.

Now the control process in practical application will be described of the behavior control apparatus of the invention installed on RC helicopter. FIG. 6 is a flowchart of the process. This chart can be divided into two step showed as two dotted line rectangular in FIG. 6. One is coarse step of left side column where rough segregation of target/non-target is executed. The other is fine step of right side column where the target location is narrowed (refined) gradually.

At step 602, probabilistic density distribution $P(\Omega_l)$ for all attention classes $\Omega_l$ of motion are assumed to be uniform. At step 604, the mobile unit moves randomly for collecting data for learning. In this example, data set collected for stabilizing the RC helicopter 100 was used to generate 500 training data points and 200 test points.

At step 606, the CCA reinforced EM algorithm is executed for calculating parameters $\theta$ ($\mu$, $\Sigma$) which defines the probabilistic density distribution $\Omega_l$. In the present example, 20 subclasses was used at first, but the number of subclasses converges by CCA reinforced EM algorithm and finally reduced to 3 as shown in FIG. 4.

At step 608, $P(Q|\Omega_l)$ is calculated with $\theta$, where Q represents behavior command. At step 610, probabilistic relation between feature vector I and attention class $\Omega_1$ is calculated with neural network. At step 612, motion of the mobile unit is estimated by bayes' rule. Steps 602 to 612 correspond to the learning stage.

At step 614, Gaussian mixture model is calculated with the use of each probabilistic density function. Part of the image which is not included in Gaussian mixture model is separated as non-target.

At step 616, the target object is recognized by template matching and probabilistic density distribution $\Omega_{TL}$ of the target location is calculated. At step 618 the center of this is defined as target location.

Figure 7:
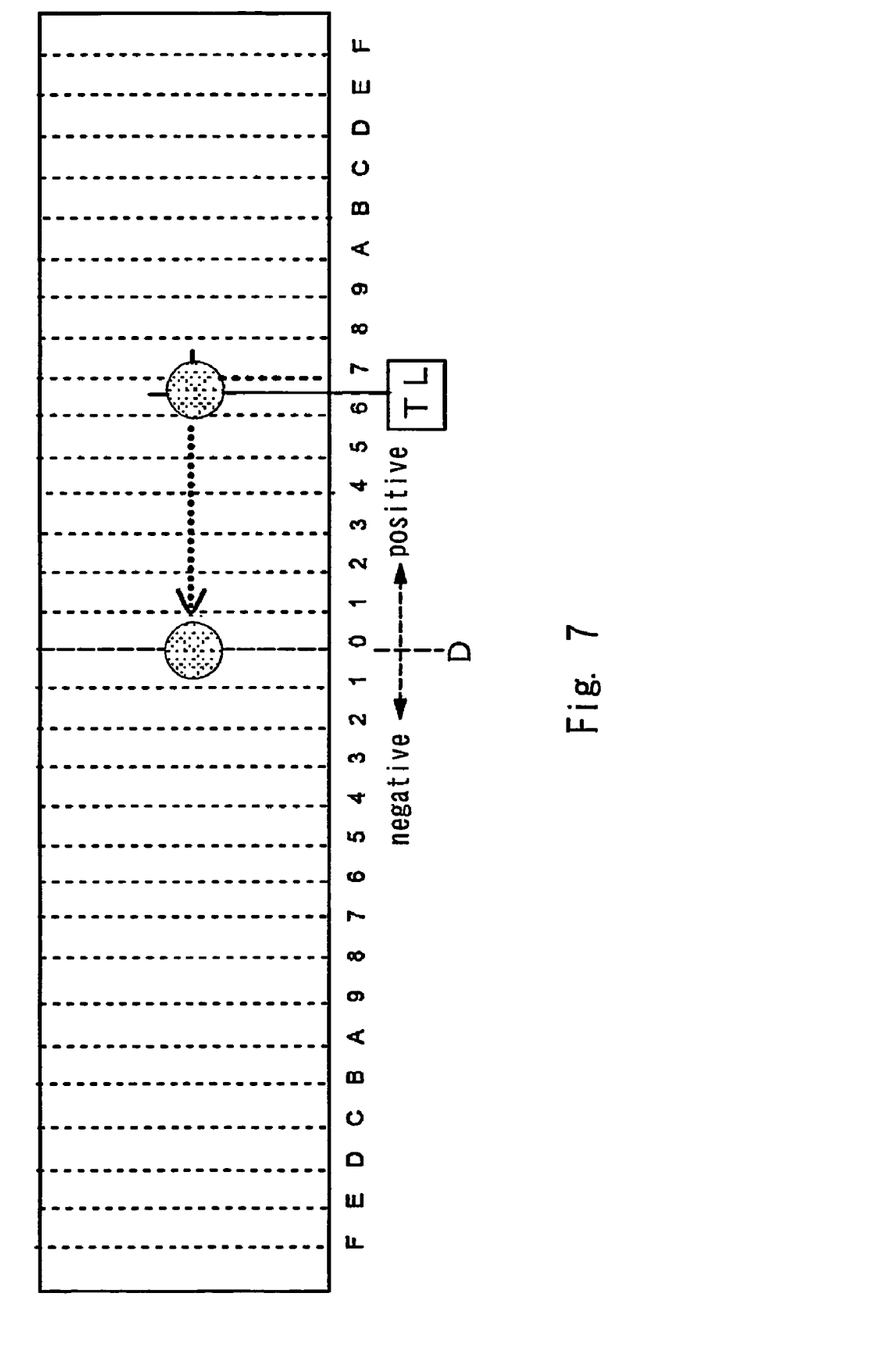
FIG. 7 is a chart illustrating a distance between a target location and center of motion.

At step 620, difference D between center of motion (COM) and the target location (TL) is calculated. At step 622, the map outputs behavior command expanding the width of motion when the helicopter is far from the target location, otherwise outputs command reducing the width of the motion. FIG. 7 shows an example of output behavior command. As seen, a map is stored in memory which takes different output value depending on D and corresponding value is searched and transmitted to the servomotor.

At step 624, it is determined whether D is smaller than the allowable error $\epsilon$. If D is larger than $\epsilon$, the accuracy of the target location is not sufficient and the process returns to step 606 to re-calculate $\theta$. That is, it attributes to the normalization problem how many number of gaussian mixture function is need to estimate the state of motion. By increasing the applied number of mixture gaussian function every time the process returns to step 606, the unit may estimate $\theta$ accurately and thus predict the target location accurately.

When D is smaller than $\epsilon$ at step 624, it shows that the helicopter is stable with sufficient accuracy for target location and so the process is terminated. By setting $\epsilon$ small, the unit may control both the location of helicopter and the duration during which the helicopter remains at that location. Steps 614 to 624 correspond to the behavior control stage.

Results

Figure 8:
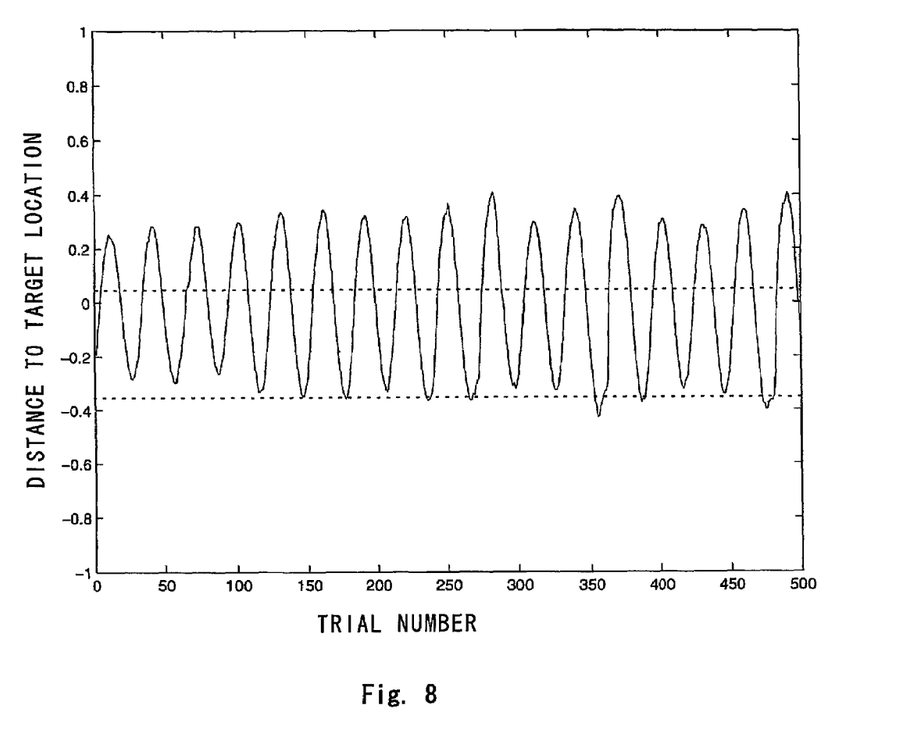
FIG. 8 is a graph illustrating unstable control status of the mobile unit on initial stage of behavior control.
Figure 9:
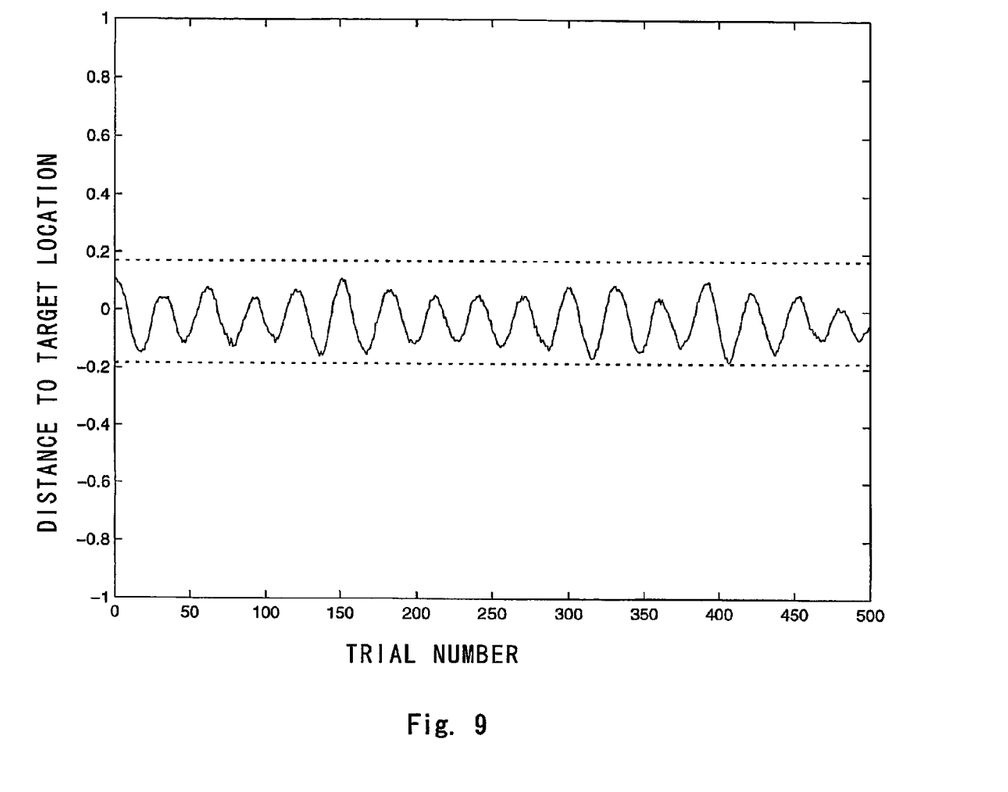
FIG. 9 is a graph illustrating that the vibration of motion of the mobile unit is getting smaller.
Figure 10:
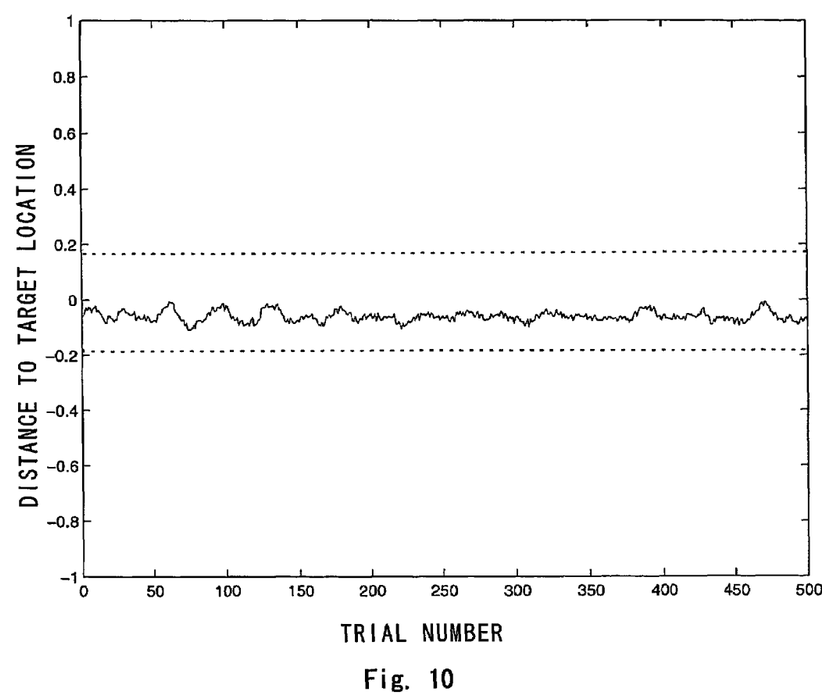
FIG. 10 is a graph illustrating stable control status of the mobile unit on last stage of behavior control.

FIGS. 8 to 10 are graphs illustrating control status of the RC helicopter. In these graphs, horizontal axis represents the number of trial and vertical axis represents the distance between center of motion (COM) and the target location (TL) when controlling the helicopter to be stable. Two dotted straight line in the graphs represent threshold values $\epsilon$ to determine stability of the control. The value $\epsilon$ is set to 0.1826 in the graphs.

FIG. 8 is graph of control immediately after the behavior control is initiated. In this case, the distance D does not become lower than $\epsilon$ and the vibration is still large, so the control is determined as to be unstable. As the target location is narrowed, the vibration becomes smaller (as FIG. 9). Finally, the control status becomes stable as shown in FIG. 10.

Some preferred embodiments have been described, but this invention is not limited to such embodiments. For example, the behavior control apparatus may not be installed on the mobile unit. In this case, only the CCD camera is installed on the mobile unit and the behavior control apparatus is installed on another place. Then information is transmitted through wireless communication between the camera and the apparatus.

INDUSTRIAL APPLICABILITY

According to one aspect of the invention, the behavior control apparatus roughly segregate target area that includes a target object of behavior from sensory inputs, such as images, based on the estimation of motion. The apparatus then specifies a target object from the target area, acquires location of the target object and output behavior command which moves the mobile unit toward the location. Thus, detailed feature of the target object need not be predetermined. In addition, because the features irrelevant to present behavior are eliminated, the computational load is reduced. Therefore, highly efficient and accurate control for the mobile unit may be implemented.

According to another aspect of the invention, the behavior control apparatus pre-learns the relationship between sensory inputs and behavior commands. Then the apparatus updates the learning result when new feature is acquired on behavior control stage. The learning result is represented as probabilistic density distribution. Thus, motion of the mobile unit on behavior control stage may be estimated with high accuracy.

The invention claimed is:

1. A behavior control apparatus wherein a target object to be used as a control reference is extracted from captured sensory inputs and behavior of a mobile unit is controlled using a location of the target object as the control reference, the apparatus comprising:
   sensory input capturing means for capturing sensory inputs including a target object;
   motion estimating means for estimating motion of the mobile unit;
   target segregation means for segregating from the sensory input the portion thereof in which the target object to be a target for behavior of the mobile unit is located;
   target object matching means for extracting the target object from said segregated portion;
   target location acquiring means for acquiring the location of the target object; and
   behavior decision means for deciding behavior command for controlling the mobile unit based on the location of the target object.

2. The behavior control apparatus claimed in claim 1, said motion estimating means comprising:
   behavior command output means for outputting said behavior command;
   behavior evaluation means for evaluating the result of the behavior of the mobile unit;
   learning means for learning the motion of the mobile unit using the relationship between said sensory inputs and said behavior result; and
   storage means for storing the learning result.

3. The behavior control apparatus claimed in claim 2, wherein said learning result is probabilistic density distribution.

4. The behavior control apparatus claimed in claim 1, wherein said target segregation means segregates said portion by comparing the sensory inputs and said estimated motion.

5. The behavior control apparatus claimed in claim 4, wherein said segregation is done by utilizing optical flow.

6. The behavior control apparatus claimed in claim 1 wherein said target location acquiring means defines the center of the target object as the location of said target object;
   said behavior decision means outputs the behavior command to move the mobile unit toward said location of the target object.

7. The behavior control apparatus claimed in claim 6, wherein said behavior decision means calculates the distance between the mobile unit and the location of said target object, said behavior decision means deciding the behavior command to decrease the calculated distance.

8. The behavior control apparatus claimed in claim 7, wherein if the calculated distance is greater than a predetermined value, said target segregation means repeats segregating said portion which includes a target object.

9. The behavior control apparatus claimed in claim 1, wherein said sensory input capturing means captures images of the external environment of the mobile unit as the sensory inputs.

10. The behavior control apparatus claimed in claim 1, wherein said target object matching means extracts target object by pattern matching between the sensory inputs and predetermined templates.

11. The behavior control apparatus claimed in claim 1, wherein said sensory inputs capturing means is a gyroscope which captures motion of the mobile unit.

12. A method for controlling behavior of a mobile unit using behavior command wherein a target object to be used as a control reference is extracted from captured sensory inputs and behavior of the mobile unit is controlled using a location of the target object as the control reference, the method, comprising the steps for:
   capturing sensory inputs including a target object;
   estimating motion of the mobile unit;
   segregating the portion of the sensory inputs which includes a target object to be target for behavior of the mobile unit;
   extracting the target object from said segregated portion;
   acquiring the location of said target object; and
   controlling the mobile unit based on the location of target object.

13. The method claimed in claim 12, wherein said estimating step further comprises:
outputting said behavior command;
evaluating the result of the behavior of the mobile unit;
learning the motion of the mobile unit using the relationship between said sensory inputs and said behavior result; and
storing the learning result.

14. The method claimed in claim 13, wherein said learning result is probabilistic density distribution.

15. The method claimed in claim 12, wherein said segregating is done by comparing the sensory inputs and said estimated motion.

16. The method claimed in claim 15, wherein said segregation is done by utilizing optical flow.

17. The method claimed in claim 12, wherein center of the target object is defined as the location of said target object;
said behavior command being determined so as to move the mobile unit toward said location of the target object.

18. The method claimed in claim 17, wherein the distance between the mobile unit and the location of the center of said target object is calculated, and then the behavior command is determined to decrease the calculated distance.

19. The method claimed in claim 18, wherein if the calculated distance is greater than a predetermined value, said segregating step is repeated.

20. The method claimed in claim 12, wherein said sensory inputs are images of the external environment of the mobile unit.

21. The method claimed in claim 12, wherein said extracting is done by pattern matching between the sensory inputs and predetermined templates.

22. The method claimed in claim 12, wherein motion of the mobile unit is captured using a gyroscope.

23. Computer program for implementing computer controlled behavior of a mobile unit by:
capturing sensory inputs including a target object;
estimating motion of the mobile unit;
segregating the portion of the sensory inputs which includes a target object to be target for behavior of the mobile unit from sensory inputs;
extracting the target object from said segregated portion;
acquiring the location of said target object; and
controlling the mobile unit based on the location of target object.

24. A computer-readable recording medium containing a program for controlling behavior of a mobile unit by implementing a computer for:
capturing sensory inputs including a target object;
estimating motion of the mobile unit;
segregating the portion of the sensory inputs which includes a target object to be target for behavior of the mobile unit from sensory inputs;
extracting the target object from said segregated portion;
acquiring the location of said target object; and
controlling the mobile unit based on the location of target object.

* * * * *